United States Patent

[11] 3,592,300

[72] Inventor Thomas G. Thomas
 Bedford, Ind.
[21] Appl. No. 872,963
[22] Filed Oct. 31, 1969
[45] Patented July 13, 1971
[73] Assignee General Motors Corporation
 Detroit, Mich.

[54] SELF-ENERGIZING DISC BRAKE
 4 Claims, 2 Drawing Figs.
[52] U.S. Cl. ........................................................ 188/72.2,
 188/106
[51] Int. Cl. .................................................... F16d 55/14
[50] Field of Search ............................................ 188/70 B,
 72.2, 106 F

[56] References Cited
UNITED STATES PATENTS

| | | | |
|---|---|---|---|
| 3,318,420 | 5/1967 | Adams .......................... | 188/72.2 |
| 3,392,807 | 7/1968 | Sommers ...................... | 188/72.2 |
| 3,422,933 | 1/1969 | Van House et al ............ | 188/72.2 |

Primary Examiner—Duane A. Reger
Attorneys—W. E. Finken and D. D. McGraw

ABSTRACT: A disc brake is provided with primary and secondary friction-braking means, the brake reaction force from the primary friction-braking means acting through toggle arms to engage the secondary friction-braking means with the disc. The actuating link which moves the toggle arms is also connected to be moved mechanically through a parking brake pedal to engage the secondary friction-braking means with the disc and thereby provide a mechanically actuated parking brake.

PATENTED JUL13 1971 3,592,300

INVENTOR.
Thomas G. Thomas
BY
D.D. McGraw
ATTORNEY

SELF-ENERGIZING DISC BRAKE

The invention relates to a disc brake mechanism and more particularly to one in which a portion of the energizing force of the mechanism is generated by brake reactuation force. The brake assembly embodying the invention has a movable primary caliper or brake shoe arrangement which drives the secondary brake shoes. This servo action is so arranged as to act during both forward and reverse braking. The brake reaction movement of the primary caliper or friction-braking means is transmitted to normally aligned toggle arms to which the secondary brake shoes are attached. Therefore, movement of the primary caliper moves the center portion of the toggle arms, tending to cause the toggle arms to form an angle, thereby bringing the ends of the toggle arms closer together. This moves the secondary brake shoes into braking engagement with the disc. The parking or emergency brake cable is attached so as to move the center pivot of the toggle arms in a similar manner. Therefore, the secondary brake shoes may be mechanically applied independently of actuation of the primary brake shoes. The assembly is provided with return springs so that when all of the brake shoes are released, the toggle arms are returned to a center or aligned position. The servo action minimizes the initial shoe force required on the primary shoes and permits sufficient braking to be obtained at either lower hydraulic brake pressures or by use of smaller area wheel cylinders, or both. The assembly requires a less massive primary caliper than the caliper of the nonservo type. Movement of the primary caliper compensates for lost motion due to caliper deflection and brake shoe travel in the secondary caliper.

IN THE DRAWING

Figure 1:
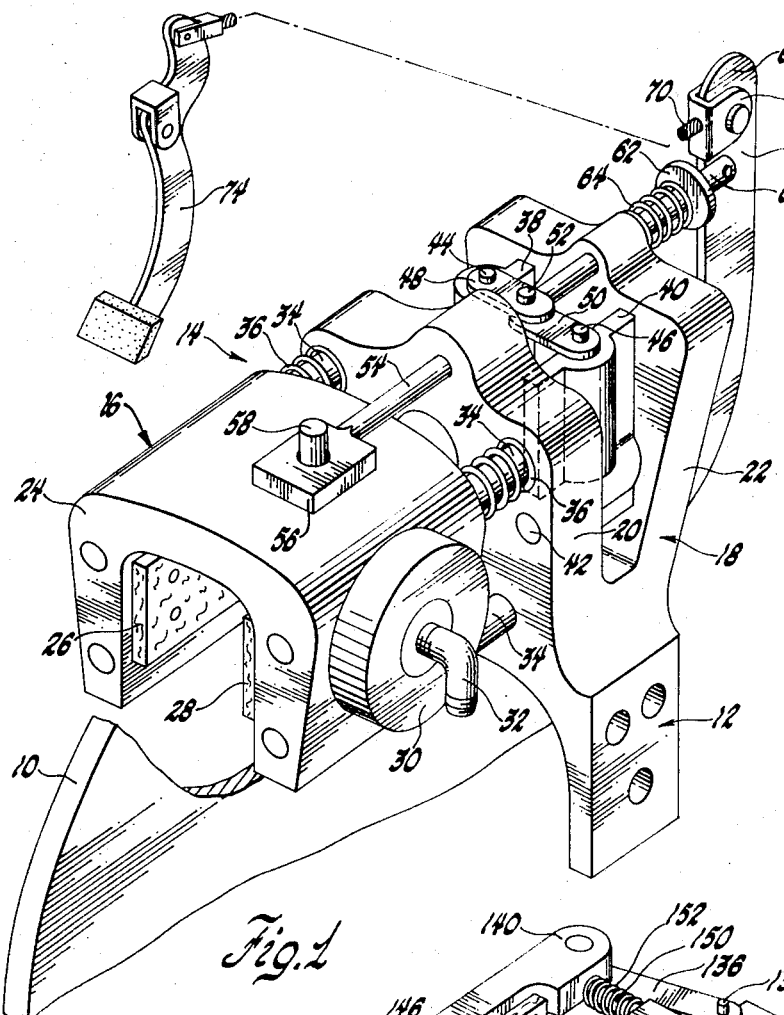
FIG. 1 is a perspective view with parts broken away, of disc brake assembly embodying the invention.

The disc brake assembly of FIG. 1 includes a rotatable disc brake 10 suitably mounted to rotate relative to the fixed support member 12. In the typical installation, disc 10 will be attached to a vehicle wheel for rotation therewith and support member 12 will be attached to an axle housing or a steering knuckle of a vehicle.

The overall caliper assembly 14 includes a primary caliper 16 and a secondary caliper 18. The secondary caliper is formed as a part of fixed support member 12 and includes arms 20 and 22. These arms extend adjacent one side of the disc 10, over its periphery, and radially inwardly of the disc on the other side. The primary caliper 16 includes a housing 24 in which the primary friction pads 26 and 28 are mounted to engage opposite sides of the disc 10. An hydraulic actuating cylinder 30 is provided as a part of housing 24 and is connected by line 32 to a suitable source of brake-actuating pressure such as a master cylinder. In the particular construction illustrated, caliper 16 is provided with a single actuating cylinder so that the piston of the cylinder 30 moves the primary friction pad 28 into engagement with the disc 10, and at the same time bringing the disc and friction pad 26 together. This may be accomplished by providing some transverse flexibility in the mounting of the primary caliper 16, to be described, or the disc 10 may be suitably mounted on the shaft so as to be moved slightly along its axis as the primary caliper is energized.

In the particular construction illustrated, mounting and guide pins 34 are provided to permit generally tangential or chordal sliding movement of the caliper relative to the disc when the friction pads 26 and 28 are engaged with the disc. The caliper housing may be slidable on the pins 34 for this purpose. These pins are suitably mounted in arm 20 of the fixed support member 12. Caliper return springs 36 are provided about some or all of guide pins 34. When the caliper has moved toward the fixed support member 12 to compress the springs, upon brake release the caliper is returned by the springs 36 to its original position.

The secondary friction shoe 40 is mounted on a pivot pin 42 between fixed support member arms 20 and 22. Shoe 38 is similarly mounted on the other side of the disc. The pivot pins 42 are positioned generally parallel to disc 10 so that pivotal movement of shoes 38 and 40 about their respective pins cause the shoes, and the friction pads secured thereto, to move toward and away from opposite sides of disc 10. The upper ends of shoes 38 and 40 are respectively provided with pins 44 and 46 to which toggle arms 48 and 50 are respectively pivoted. The outer ends of toggle arms 48 and 50 receive pins 44 and 46, and the inner ends of these arms receive pivot pin 52. Pin 52 is also secured to the secondary shoe-actuating link 54. This link is piloted through passages in arms 20 and 22 and has its end 56 pivotally attached to caliper housing 24 by pin 58. The actuating link 54 functions as a brake reaction force-transmitting means to transmit such force from the caliper 16 to the toggle arms 48 and 50. The other end 60 of link 54 is provided with a spring seat 62 and a return spring 64 acting on the spring seat and one side of arm 22 so as to urge the link 54 to a position at which toggle arms 48 and 50 are in linear alignment. This is the neutral or center position of the secondary caliper-actuating means.

A lever 66 has one end suitably attached to fixed support member 12 and the other end provided with a clevis 68 to which the parking brake cable 70 is attached. An intermediate portion of lever 66 is secured to the end 60 of link 54 at pivot 72. Cable 70 is also attached to the parking brake lever 74 in such a manner that actuation of the parking brake lever tensions the cable and causes lever 66 to move toward arm 22 against the force of return spring 64.

In operation, the return springs 36 and 64 maintain the brake calipers in the neutral position illustrated. When the vehicle brakes are applied, friction pads 26 and 28 engage rotating disc 10 and the generated brake reaction force moves caliper 16 toward arm 20 as the disc is rotating in the direction of the arrow thereon. If the disc is rotated in the other direction, caliper 16 is moved away from arm 20. Movement of this caliper is transmitted through link 54, as is the generated brake reactuation force, to actuate toggle arms 46 and 48. If the arms move out of alignment with each other, their outer ends are forced together and the secondary caliper is energized. Upon release of hydraulic pressure in the actuating cylinder 30, the brake apply force in the secondary caliper is also decreased since the brake reaction force of the primary caliper is the brake apply force of the secondary caliper. This permits the return springs to recentralize the system.

When it is desired to mechanically actuate the brake assembly, the parking brake lever is moved to tension cable 70, causing actuating link 54 to move leftwardly as seen in the drawing and actuate the secondary brake through the toggle arms 48 and 50.

Figure 2:
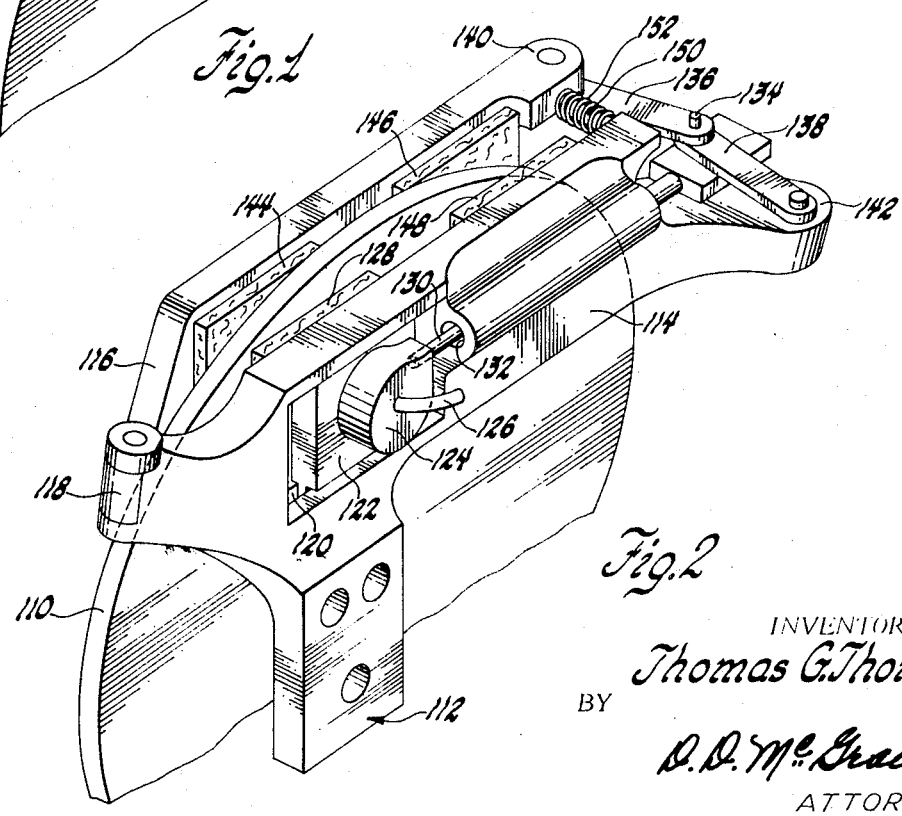
FIG. 2 is a perspective view of parts broken away of a modified disc brake assembly embodying the invention.

The modification illustrated in FIG. 2 shows a hinged caliper arrangement and, for clarity, the parking brake is not illustrated. The disc 110 is mounted as before, and the fixed support member 112 is mounted adjacent the disc. The support member includes a fixed frame 114 and a movable frame 116 positioned on the opposite sides of the disc 110. The frames are joined together in a suitable manner such as by hinge 118. This hinge is at one end of the two frames. Frame 114 is slotted at 120 to provide a guide and mounting arrangement for the primary shoe housing 122. The primary actuating cylinder 124 is provided as a part of housing 122 and is suitably connected to a master cylinder by brake line 126. The slotted guide 120 for shoe housing 122 permits chordal or generally tangential movement of the shoe housing and the primary cylinder, relative to the disc, in accordance with brake reaction force generated when the cylinder is actuated to move the primary friction pad 128 into engagement with one side of disc 110.

The acting link or rod 130 is piloted in a fixed frame passage 132 so that one end is secured to housing 122 and the other end is pivotally attached to the center pivot 134 of toggle arms 136 and 138. The outer end of toggle arm 136 is pivotally attached to the free end 140 of movable frame 116. The outer end of toggle 138 is pivotally attached to the free end 142 of the stationary frame 114. Secondary friction members 144 and 146 are mounted on movable frame 116, and secondary friction member 148 is mounted on stationary frame 114. A suitable adjusting screw 150 and return spring 152 may be provided between movable frame 116 and stationary frame 114.

Upon energization of the primary cylinder 124, primary friction pad 128 engages the side of disc 110. The brake reaction force causes the shoe housing 122 to move in its guide slot 120. Depending upon the direction of rotation of disc 110, the brake reaction force is transmitted either through tension or compression to move the center pivot 134 of the toggle arms. As illustrated in FIG. 2, this movement has taken place to the right, causing the toggle arms 136 and 138 to form a slight angle and pulling their ends together. Therefore, movable shoe frame 116 has moved about the axis of its hinge 118, engaging the secondary shoes with the disc 110. Disc 110 may be splined or otherwise suitably secured about its shaft to permit sufficient disc movement to allow the shoes to be so engaged. Release of pressure in cylinder 124 decreases the brake reaction force transmitted to the toggle arms, and the return spring 152 moves frame 116 outwardly to disengage the secondary friction members from the disc.

What I claim is:

1. A disc brake assembly comprising:
a rotatable disc to be selectively braked,
a fixed support member adjacent said disc,
a primary caliper having primary friction-braking means selectively actuatable to engage said disc in braking relation and having at least one of said friction-braking means operatively slidably mounted on said fixed support member to move parallel to the plane of rotation of said disc and generally tangentially of said disc in response to brake reaction force when actuated,
a secondary caliper having said fixed support member as a part thereof and including secondary friction-braking means and a pair of toggle arms operatively connected at their outer ends to said secondary friction-braking means,
said toggle arms further having pivot means connecting their inner ends,
and brake reaction force-transmitting means operatively interconnecting said at least one slidably mounted friction-braking means and said pivot means to transmit brake reaction force to said pivot means irrespective of the direction of rotation of said disc to act through said toggle arms to move said secondary friction-braking means into braking engagement with said disc and exert braking force thereon in accordance with the brake reaction force of said at least one slidably mounted friction braking means.

2. The disc brake assembly of claim 1,
said primary caliper including a C-shaped housing mounting said primary friction-braking means and having brake-actuating means for moving said primary friction-braking means into braking engagement with said disc,
said C-shaped caliper housing moving relative to said fixed support member when actuated as aforesaid,
said brake reaction force-transmitting means being connected to said C-shaped caliper housing.

3. The brake assembly of claim 1,
said primary caliper including a part of said fixed support member,
said primary friction-braking means including a shoe slidably mounted in said part of said fixed support member and having a brake-actuating means moving said primary friction-braking means into braking engagement with said disc,
said secondary caliper including another part of said fixed support member and being a hinged caliper in which one side is formed by said fixed support member and the other side is formed by a movable frame which is hinged thereto, said fixed support member and said movable frame each providing a mounting for at least one of said secondary friction-braking means, the free end of said movable frame being joined to said fixed support member by said toggle arms,
movement of said brake reaction force-transmitting means acting through said toggle arms to move said movable frame pivotally to engage said secondary friction-braking means with said disc.

4. The disc brake assembly of claim 1,
said brake reaction force-transmitting means having independent brake-actuating means connected thereto and movable independently of the actuation of said primary friction-braking means to act through said toggle arms to engage said secondary friction-braking means with said disc to provide a parking brake.